United States Patent
Yu et al.

(10) Patent No.: US 7,651,972 B2
(45) Date of Patent: Jan. 26, 2010

(54) METHOD OF MANUFACTURING HIGH-CRUSH-STRENGTH IRIDIUM CATALYST FOR HYDRAZINE DECOMPOSITION REACTION IN SPACECRAFT THRUSTERS USING BAUXITE

(75) Inventors: Myoung-Jong Yu, Daejeon (KR);
Kyun-Ho Lee, Gyeonggi-do (KR);
Su-Kyum Kim, Incheon (KR);
Joon-Min Choi, Daejeon (KR);
Sung-June Cho, Gwangju (KR)

(73) Assignee: Korean Aerospace Research Institute, Daejeon (KR)

(*) Notice: Subject to any disclaimer, the term of this patent is extended or adjusted under 35 U.S.C. 154(b) by 414 days.

(21) Appl. No.: 11/586,645

(22) Filed: Oct. 26, 2006

(65) Prior Publication Data
US 2007/0167322 A1    Jul. 19, 2007

(30) Foreign Application Priority Data
Dec. 23, 2005    (KR) ............. 10-2005-0128682

(51) Int. Cl.
*B01J 23/00* (2006.01)
*B01J 23/02* (2006.01)
*B01J 23/40* (2006.01)
*B01J 23/42* (2006.01)
*B01J 23/56* (2006.01)
*B01J 20/00* (2006.01)
*B01J 21/04* (2006.01)

(52) U.S. Cl. .......... 502/326; 502/242; 502/261; 502/263; 502/327; 502/332; 502/350; 502/351; 502/355; 502/415; 502/439

(58) Field of Classification Search ........ 502/326, 502/327, 332, 350, 355, 415, 439
See application file for complete search history.

(56) References Cited

U.S. PATENT DOCUMENTS

| | | | |
|---|---|---|---|
| 2,928,814 A * | 3/1960 | Mills et al. | 526/100 |
| 6,159,896 A * | 12/2000 | Zoeller et al. | 502/326 |
| 6,355,595 B1 * | 3/2002 | Zoeller et al. | 502/312 |

\* cited by examiner

*Primary Examiner*—Cam N Nguyen
(74) *Attorney, Agent, or Firm*—Holland & Knight LLP

(57) ABSTRACT

Disclosed herein is a method for manufacturing a high-crush-strength iridium catalyst for hydrazine decomposition for spacecraft and satellite propulsion using bauxite, the method including: an acid treatment step of bringing bauxite into contact with a 0.1-10 M acid solution for 10-14 hr; a filtration step of filtering the acid-treated bauxite as a solid to remove the remaining acid and impurities; a thermal treatment step of bringing the filtered bauxite into contact with hot air at a temperature of 500-700° C. for 2-6 hr; a catalyst loading step of loading an iridium catalyst onto the thermally treated bauxite; and a reduction step of reducing the catalyst of the catalyst-loaded bauxite.

12 Claims, 1 Drawing Sheet

METHOD OF MANUFACTURING HIGH-CRUSH-STRENGTH IRIDIUM CATALYST FOR HYDRAZINE DECOMPOSITION REACTION IN SPACECRAFT THRUSTERS USING BAUXITE

BACKGROUND OF THE INVENTION

1. Field of the Invention

The present invention relates to a method for manufacturing a high-crush-strength iridium catalyst for hydrazine decomposition for spacecraft propulsion, and an iridium catalyst manufactured thereby, and more particularly to a method for manufacturing an iridium catalyst for hydrazine decomposition for spacecraft propulsion, which comprises conducting acid treatment and thermal treatment steps, such that the iridium catalyst can show high-strength characteristics at high temperatures, as well as an iridium catalyst manufactured thereby.

2. Description of the Prior Art

Thrusters implemented in spacecraft and satellites are mainly used to control the attitude and altitude of the spacecraft. Thrusters for spacecraft are preferably engines, which are as small as possible and must exhibit a high thrust force.

A thruster, which injects gas resulting from hydrazine decomposition reaction through a nozzle, is an engine which satisfies such conditions. Typically, the thruster contains an iridium-based or rhenium-iridium-based catalyst and anhydrous hydrazine.

Hydrazine decomposition reaction is a high-temperature reaction occurring at 600-900° C. When high-pressure hydrazine liquid is sprayed on the catalyst surface, high-temperature thermal shock and high pressure are generated, resulting in the loss of the catalyst, thereby decreasing the hydrazine decomposition activity.

The mechanical strength and crush strength of the iridium catalyst must be considered during the manufacture of the iridium catalyst, because the spacecraft and satellites are operated for more than 10 years. However, a metal catalyst such as iridium cannot resist heat and pressure generated during a hydrazine decomposition reaction, and thus such a metal catalyst is generally supported on a support.

The support of the hydrazine decomposition catalyst must withstand a crush strength of 18 lbs or higher at room temperature and show a hydrogen adsorption larger than 600 $\mu mol^{-1} \cdot g^{-1}$ (based on atomic hydrogen).

For such purposes, alumina, silica, titania, zirconia, carbon, etc., are utilized as the support, and among them the precipitated alumina is known to show superior performance as the support for the hydrazine decomposition catalyst, and thus has been mainly used.

The precipitated alumina undergoes a phase transition from γ type to α type even at a temperature less than 900° C. with a drastic decrease in its specific surface area and, at the same time, the crush strength thereof is abruptly reduced to less than 10 lbs.

The crush strength of alumina can be increased by increasing the chemical bonds between alumina crystals, but it becomes useless when it is subjected to high-temperature attrition loss conditions during a hydrazine decomposition reaction.

On the other hand, it is difficult to use a pure precipitated alumina as a support to provide an iridium catalyst that has good crush strength and activity and, at the same time, can resist a high-temperature attrition loss condition of 600-900° C.

SUMMARY OF THE INVENTION

It is an object of the present invention to provide a method for manufacturing an iridium catalyst for hydrazine decomposition for spacecraft and satellite propulsion, which is prepared through the acid treatment and thermal treatment of bauxite so as to have a crush strength of 50-60 lbs and a specific surface area of 50-100 $m^2 \cdot g^{-1}$ at 1000° C., solves the problems with precipitated alumina as the prior support, including phase transition from γ type to α type with a drastic decrease in surface area even below 900° C., and a rapid reduction in crush strength to less than 10 lbs, and can be used in a decomposition reaction of liquid fuel such as hydrazine in a high-temperature attrition loss condition of 600-900° C., as well as an iridium catalyst manufactured thereby.

To achieve the above object, the present invention provides a method for manufacturing a high-crush-strength iridium catalyst for hydrazine decomposition for spacecraft and satellite propulsion using bauxite, the method comprising: (1) an acid treatment step of bringing bauxite into contact with a 0.1-10 M acid solution for 10-14 hr; (2) a filtration step of filtering the acid-treated bauxite as a solid to remove the remaining acid and impurities; (3) a thermal treatment step of bringing the filtered bauxite into contact with hot air at a temperature of 500-700° C. for 2-6 hr; (4) a catalyst loading step of loading an iridium catalyst onto the thermally treated bauxite; and (5) a reduction step of reducing the catalyst of the catalyst-loaded bauxite.

The inventive method may further comprise, before said acid treatment step, a component control step of adding a component selected from the group consisting of alumina sol, silica sol, titania sol, and mixtures of two or more thereof, to the bauxite so as to control the composition of the bauxite to 85-90 wt % $Al_2O_3$, 5-10 wt % $SiO_2$ and 5-10 wt % $TiO_2$.

In the acid treatment step, the acid may be selected from the group consisting of hydrochloric acid, sulfuric acid, nitric acid, and mixtures of two or more thereof.

In the thermal treatment step, the contact between the bauxite and the hot air may be performed by spraying the hot air toward the surface of the acid-treated bauxite at a flow rate of 100-200 $cc \cdot g^{-1} \cdot min^{-1}$.

The catalyst loading step may comprise: a catalyst contacting step of bringing the thermally treated bauxite into contact with an iridium solution containing an iridium compound for 20 minutes; a filtration step of filtering the bauxite from the iridium solution; and a heating step of heating and drying the filtered bauxite to remove hydrochloric acid vapor.

In the catalyst loading step, the loading of the bauxite with the iridium solution may be repeated 10-20 times such that the amount of atomic iridium loaded onto the bauxite is 30-35 wt % based on the weight of the bauxite.

In the catalyst loading step, the iridium compound in the iridium solution may be selected from the group consisting of $IrCl_3$, $Ir[(NH_3)_5Cl]Cl_2$, $H_2IrCl_6$, $Ir(NH_3)_6Cl_3$, etc. The concentration of the iridium solution can be 50-60 wt %.

The iridium solution containing iridium chloride may be prepared by dissolving $IrCl_3$ in water at 40-60° C., and then cooling the solution to room temperature. Preferably, it can be prepared by dissolving iridium chloride in water at 40-60° C., cooling the solution to room temperature and then standing the cooled solution at room temperature for 20-30 hr.

In the heating step, the filtered bauxite may be heated to 350-450° C. for 10-30 min to remove HCl vapor.

In the heating step, the removal of the HCl vapor may be accelerated by directing hot air having a temperature of 150-200° C. vertically downward toward the filtered bauxite.

The reduction step may be performed by heating the catalyst-loaded bauxite to 500-700° C. for 5-7 hr while bringing the bauxite into contact with nitrogen gas having a flow rate of 400-600 $cc^{-1} \cdot g^{-1} \cdot min^{-1}$ to remove HCl vapor and residue, cooling the heated bauxite to room temperature, and then heating the cooled bauxite to 500-700° C. for 5-7 hr while bringing the bauxite into contact with hydrogen gas having a flow rate of 100-200 $cc^{-1} \cdot g^{-1} \cdot min^{-1}$ to reduce the iridium ion or oxide.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
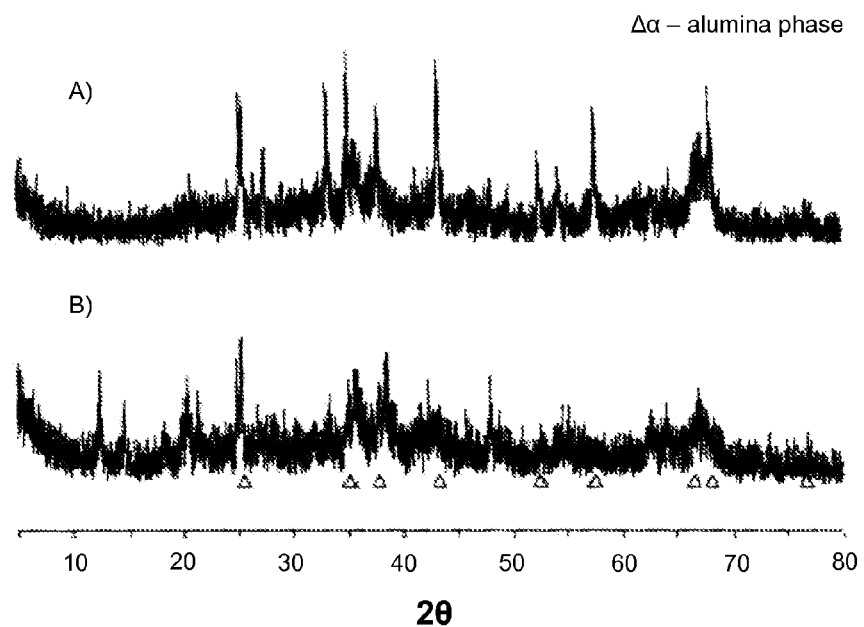
FIG. 1 shows the X-ray diffraction patterns of pretreated bauxite (where "a" represents acid-treated bauxite, and "b" represents acid-treated and subsequently heated bauxite)

Hereinafter, the present invention will be described in detail with reference to the accompanying drawings.

The present invention provides a method for manufacturing a high-crush-strength iridium catalyst for hydrazine decomposition for spacecraft and satellite propulsion using bauxite, the method comprising: (1) an acid treatment step of bringing bauxite into contact with a 0.1-10 M acid solution for 10-14 hr; (2) a filtration step of filtering the acid-treated bauxite as a solid to remove the remaining acid and impurities; (3) a thermal treatment step of bringing the filtered bauxite into contact with hot air at a temperature of 500-700° C. for 2-6 hr; (4) a catalyst loading step of loading an iridium catalyst onto the thermally treated bauxite; and (5) a reduction step of reducing the catalyst of the catalyst-loaded bauxite.

The acid treatment step (1) is conducted by bringing the bauxite into contact with the acid of a 0.1-10 M concentration for 10-14 hr, resulting in the removal of impurities such as alkali and alkaline earth metal ions, including iron oxide, magnesium, calcium, sodium, etc. When the acid concentration is below 0.1 M and the contact time is more than 10 hr. the impurities cannot be removed completely. On the other hand, the bauxite can be dissolved when the concentration is more than 10 M and the contact time is more than 14 hr.

Before step (1), the inventive method may further comprise, before said acid treatment step, a component control step of adding a component selected from the group consisting of alumina sol, silica sol, titania sol, and mixtures of two or more thereof, to the bauxite so as to control the composition of the bauxite to 85-90 wt % $Al_2O_3$, 5-10 wt % $SiO_2$ and 5-10 wt % $TiO_2$. Through the component control step, the content of components contributing to the physical properties of a support, particularly, the content of alumina, can be maintained constant and at levels intended in the present invention. If the content of alumina is below 85 wt %, the active catalytic surface area will be decreased, and if the alumina content is above 90 wt %, the mechanical strength of the catalyst can be reduced. Furthermore, if the content of silica is below 5 wt %, the mechanical strength of the catalyst can be decreased, and if the silica content is above 7 wt %, the active surface area of the catalyst can be decreased. Preferably, the alumina sol has a solid content of 30 wt %, and the titania sol has a solid content of 3 mol %.

In the acid treatment step (1), the acid can be selected from the group consisting of hydrochloric acid, sulfuric acid, nitric acid, and mixtures of two or more thereof. The choice of the acid and the optimum acid concentration depend on the solubility of alumina oxide and silica oxide in the acid.

Step (2) consists of filtering the bauxite solid from the acid and can be considered as a pretreatment step for the subsequent thermal treatment step. The filtration in step (2) is preferably performed at room temperature to avoid excessive dissolution.

The thermal treatment step (3) can be performed by bringing the acid-treated bauxite into contact with hot air having a temperature of 400-700° C. for 2-6 hr. The aforementioned thermal treatment removes HCl vapor and converts $Al(OH)_3$ into $Al_2O_3$. It is of note that HCl is removed as vapor in the step (3). The air flow rate in the aforementioned thermal treatment can be controlled to 100-200 $cc^{-1} \cdot g^{-1} \cdot min^{-1}$ and the hot air flow should be directed to the surface of the acid-treated bauxite. If the flow rate of hot air in step (3) is below 100 $cc^{-1} \cdot g^{-1} \cdot min^{-1}$, a trace amount of HCl residue can remain, and if it is more than 200 $cc^{-1} \cdot g^{-1} \cdot min^{-1}$, the bauxite will be lost. In the thermal treatment step, heating and contact with the hot air can be carried out at the same time.

In catalyst loading step (4), the iridium catalyst is supported on the thermally treated bauxite. The step (4) comprises: a catalyst contacting step of bringing the thermally treated bauxite into contact with an iridium solution containing an iridium compound for 20 minutes; a filtration step of filtering the bauxite from the iridium solution; and a heating step of heating and drying the filtered bauxite to remove hydrochloric acid vapor. If the contact time is less than 20 minutes, the catalyst will not be sufficiently loaded, so that the loading of the catalyst will be insufficient or the distribution of the catalyst will be non-uniform. If the contact time exceeds 20 minutes, there will be a significant loss of alumina into the acidic solution.

After the contact between the catalyst and the solution containing iridium salt, the sample is filtered to remove the supernatant solution and then dried to remove HCl vapor for the loading of the next catalyst. The catalyst loading step is preferably repeated 10-20 times such that the amount of atomic iridium loaded onto the bauxite is 30-35 wt % based on the weight of the bauxite. If the amount of atomic iridium loaded onto the bauxite is below 30 wt %, the catalyst activity will be too low to provide sufficient propulsion activity, and if it is above 35 wt %, it will not be cost-effective.

In catalyst loading step (4), $IrCl_3$, $Ir[(NH_3)_5Cl]Cl_2$, $H_2IrCl_6$ or $Ir(NH_3)_6Cl_3$ can be used as the impregnating solution, and the concentration of the iridium solution is preferably 50-60 wt %. If the iridium solution concentration is below 50 wt %, a sufficient amount of the iridium catalyst cannot be loaded, and if it exceeds 60 wt %, the precise metal salt can be precipitated.

The aforementioned metal solution can be made by dissolving $IrCl_3$ in water at 40-60° C. and cooling the solution to room temperature. Preferably, the solution should be aged for 20-30 hr at room temperature, after complete dissolution and cooling to room temperature. If the dissolution temperature is less than 40° C., the dissolution of iridium chloride will not be complete, and if it is above 60° C., the concentration will not be controlled well due to the evaporation of the solvent. Less than 20 hr aging results in incomplete homogeneous distribution of the catalyst, while productivity is lowered upon aging for more than 30 hr.

The aforementioned thermal treatment consists of the removal of ammonium salt and HCl vapor at 350-450° C. for 10-30 min. Below 350° C. and 10 min, there is incomplete removal of HCl and metal salt, while there is metal agglomeration leading to the loss of catalytic activity above 450° C. and 30 min. The bauxite should be mixed thoroughly during the thermal treatment.

The hot air of 150-200° C. can be directed vertically downward toward the surface of the bauxite to remove HCl vapor. Such vertical downward spraying of hot air flow can promote the removal of HCl vapor without loss of bauxite granules.

If the temperature of the hot air is below 150° C., the ammonium salt and HCl vapor cannot be removed completely, while there is metal agglomeration above 200° C.

In the reduction treatment step (5), the bauxite loaded with the iridium catalyst is heated to 500-700° C. while it is brought into contact with nitrogen gas at a nitrogen flow rate of 400-600 $cc^{-1} \cdot g^{-1} \cdot min^{-1}$ for 5-7 hr to remove HCl vapor and residue. Then, the sample is cooled down to room temperature. The cooled sample is again heated to 500-700° C. for 5-7 hr while it is brought into contact with hydrogen gas at a hydrogen flow rate of 100-200 $cc^{-1} \cdot g^{-1} \cdot min^{-1}$ to reduce the iridium ion or oxide. During the reduction step, contact with nitrogen before full reduction is conducted in order to remove oxygen and or water remaining in the bauxite. If the impurities are not removed, explosions can be expected due to the sudden increase of temperature caused by the $H_2$—$O_2$ reaction. The conditions employed in the reduction step, such as heating temperature, flow rate of hydrogen, and reduction time, are obtained through the repeated experiments for the complete reduction of the iridium catalyst. Therefore, there is a danger of incomplete reduction resulting in a reduction in catalyst activity when conditions outside the range of the conditions stated in the present invention are used.

Hereinafter, the present invention will be described in detail with reference to examples. However, the scope of the present invention is not limited by these examples.

EXAMPLE 1

A yellow nugget of bauxite weighing 5 g was added to 100 ml of a solution containing 1 M $HNO_3$, and then magnetically stirred for 12 hr at 60° C., followed by filtration. The supernatant solution contained reddish $Fe^{2+}/Fe^{3+}$ ions and the resulting bauxite was white after drying at 100° C. for 12 hr. The sample was subjected to thermal treatment with air at a flow rate of 100 $cc^{-1} \cdot g^{-1} \cdot min^{-1}$ at 600° C. for 4 hr, in order to remove impurities. The obtained sample was further heated to 1000° C. in a heat treatment furnace equipped with an alumina tube, under nitrogen gas at a flow rate of 100 $cc^{-1} \cdot g^{-1} \cdot min^{-1}$ for 4 hr. FIGS. 1 (a) and (b) show the X-ray diffraction patterns of the sample before and after the acid treatment, respectively. The composition of the bauxite after the acid treatment is shown in Table 1 below.

TABLE 1

| Component | weight percent (%) |
|---|---|
| $Al_2O_3$ | 89.5 ± 0.5 |
| $SiO_2$ | 7.3 ± 0.5 |
| $TiO_2$ | 3.0 ± 0.5 |

EXAMPLE 2

Figure 2:
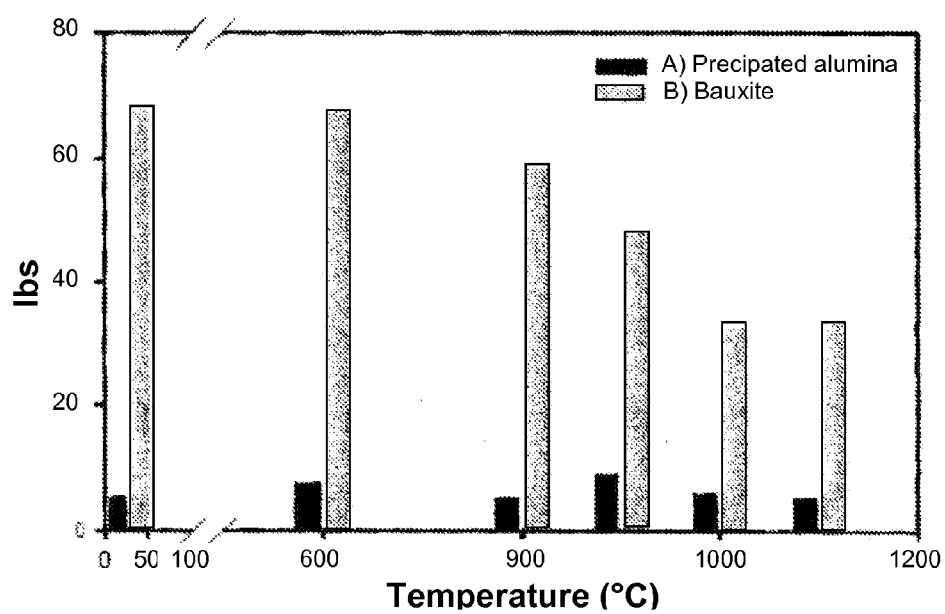
FIG. 2 is a graphic diagram showing the results of measurement of the crush strength of an acid-treated and heat-treated bauxite (where "a" represents precipitated spherical alumina, and "b" represents an acid-treated and subsequently heated bauxite).

Acid treatment and thermal treatment were carried out in the same manner as in Example 1, except that the acid concentrations were changed to 0.1 M and 0.5 M. The bauxite was divided into 18-20 mesh and 20-30 mesh portions after the acid treatment and thermal treatment. The resulting bauxite was subjected to crush strength measurement using the portable instron, FGX-20G, supplied by SHIMPO Co. (Japan). The crush strength of the bauxite pellet was measured by placing it between stainless plates (10 mm thickness) and applying pressure to get the crushing pressure. The above procedure was repeated 20 times to get the average value. The results of measurement of the bauxite are shown in FIG. 2 in comparison with those of a traditional decomposition catalyst made using precipitated alumina. As seen in FIG. 2, the bauxite showed 5-7 times higher crush strength at a low temperature region of less than 800° C., and 2-3 times higher crush strength at a high temperature region of more than 1000° C., compared to those of the precipitated alumina.

EXAMPLES 3 to 6

According to Example 1, the bauxite was subjected to acid treatment and thermal treatment and loaded with a catalyst according to the conditions shown in Table 2 below. For catalyst loading, a solution containing 2.63 g of $IrCl_3$ (54.26%) in 60 ml of water was made by dissolving the salt at 60° C. and then was contacted with the bauxite for 20 min. The catalyst solution was removed by filtration, and the remaining material was heated on a Petri dish on a hot plate set to 400° C. for 15 min and, at the same time, hot air flow of 150° C. was applied downward to the catalyst surface to remove HCl vapor. This procedure was repeated 6 times. The obtained sample was flushed with nitrogen flow at 300° C. for 3 hr at a nitrogen flow rate of 1000 ml. $min^{-1}$, and then a mixed gas of nitrogen and hydrogen (1:10 w/w) was brought into contact with the catalyst at a flow rate of 1000 ml. $min^{-1}$ for 1 hr to remove HCl. The procedure described above was repeated 3 times. For final reduction, the sample was heated to 550° C. at a heating rate of 275° C. per hour and maintained at that temperature for 1 hour while it was reduced with a hydrogen flow having a flow rate of 1000 ml. $min^{-1}$. After changing the flow gas to nitrogen, the sample was cooled down to room temperature, and finally bauxite containing 30 wt % iridium was obtained.

The bauxite catalyst subjected to acid treatment and thermal treatment according to Example 1 was measured for the distribution of iridium metal on the bauxite using a hydrogen adsorption method, and, as a result, it was observed that the bauxite subjected to acid treatment and then thermal treatment showed the highest amount of hydrogen adsorption, indicating the presence of small uniform iridium particles.

The bauxite catalysts subjected to acid treatment and thermal treatment in Examples 3 to 6 were measured for the distribution of iridium metal thereon, and the measurement results of hydrogen adsorption, specific surface area and pore volume are shown in Table 2 below.

TABLE 2

| | Example | | | |
|---|---|---|---|---|
| | 3 | 4 | 5 | 6 |
| Treatment | — | acid | thermal | Thermal + acid |
| No. of catalyst loading | 18 | 15 | 16 | 15 |
| Surface area ($m^2g^{-1}$) | 120.3 | 136.4 | 144.1 | 145.8 |
| Pore volume ($cm^3g^{-1}$) | 0.159 | 0.196 | 0.164 | 0.173 |
| Amount of hydrogen adsorption ($\mu mol^{-1}g^{-1}$) | 556.1 | 571.8 | 431.8 | 597.5 |

As shown in Table 2 above, the bauxite subjected to both acid treatment and thermal treatment showed the highest specific surface area and hydrogen adsorption amount, and the bauxite subjected only to thermal treatment showed the lowest hydrogen adsorption amount. The results indicate that the combination of acid treatment and thermal treatment provides excellent metal distribution compared to each of acid treatment and thermal treatment, and also that surface properties, surface area and pore volume can vary depending on treatment conditions.

EXPERIMENT 1

The amount of gas generated in a hydrazine decomposition reaction using the iridium-loaded bauxite samples prepared according to the methods of Examples 3, 4, 5 and 6 was measured. The measurement results showed that the bauxite loaded with 50.4 mg of iridium decomposed 1 g of hydrazine hydrate within 5 sec. From repeated measurements, it was observed that the catalyst generated 96.2 mmol of a gas product in 12 minutes, which corresponded to a turnover frequency (TOF) of iridium-loaded bauxite of 340-1040 $s^{-1}$.

From Examples and Experiment above, it was found that the bauxite catalyst subjected to acid treatment and thermal treatment had a high crush strength of about 50 lbs even at 900° C., and the resulting hydrogen adsorption was 600 μmol/g, suggesting that it can be used a hydrazine decomposition catalyst in spacecraft thrusters.

As described above, according to the present invention, it is possible to prepare a bauxite catalyst having a high surface area above 80 $m^2/g$ and a crush strength of 60 lbs even at 900° C. through acid treatment and thermal treatment using bauxite ore as a starting material. The present invention is significantly cost-effective compared to the use of precipitated alumina. Further, the present invention provides a support for catalysts, which can promote the decomposition of hydrazine or hydrazine hydrate in spacecraft propulsion thrusters.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for manufacturing a high-crush-strength iridium catalyst for hydrazine decomposition for spacecraft and satellite propulsion using bauxite, the method comprising:
    (1) an acid treatment step of bringing bauxite into contact with a 0.1-10 M acid solution for 10-14 hr;
    (2) a filtration step of filtering the acid-treated bauxite as a solid to remove the remaining acid and impurities;
    (3) a thermal treatment step of bringing the filtered bauxite into contact with hot air at a temperature of 500-700° C. for 2-6 hr;
    (4) a catalyst loading step of loading an iridium catalyst onto the thermally treated bauxite; and
    (5) a reduction step of reducing the catalyst of the catalyst-loaded bauxite.

2. The method of claim 1, which further comprises, before said acid treatment step (1) a component control step of adding a component selected from the group consisting of alumina sol, silica sol, titania sol, and mixtures of two or more thereof, to the bauxite so as to control the composition of the bauxite to 85-90% $Al_2O_3$, 5-10% $SiO_2$ and 5-10% $TiO_2$.

3. The method of claim 1, wherein the acid in the acid treatment step (1) is selected from the group consisting of hydrochloric acid, sulfuric acid, nitric acid, and mixtures of two or more thereof.

4. The method of claim 1, wherein the contact between the bauxite and the hot air in the thermal treatment step (3) is performed by spraying the hot air toward the surface of the acid-treated bauxite at a flow rate of 100-200 cc. $g^{-1} \cdot min^{-1}$.

5. The method of claim 1, wherein the catalyst loading step (4) comprises: a catalyst contacting step of bringing the thermally treated bauxite into contact with an iridium solution containing an iridium compound for 20 minutes; a filtration step of filtering the bauxite from the iridium solution; and a heating step of heating and drying the filtered bauxite to remove hydrochloric acid vapor.

6. The method of claim 5, wherein the loading of the bauxite with the catalyst is repeated 10-20 times in the iridium solution such that the amount of atomic iridium loaded onto the bauxite is 30-35 wt % based on the weight of the thermally treated bauxite.

7. The method of claim 5, wherein the iridium compound of the iridium solution in the catalyst loading step is selected from the group consisting of $IrCl_3$, $Ir[(NH_3)_5Cl]Cl_2$, $H_2IrCl_6$, and $Ir(NH_3)_6Cl_3$.

8. The method of claim 5, wherein the concentration of the iridium solution is 50-60 wt %.

9. The method of claim 5, wherein the iridium solution is prepared by dissolving $IrCl_3$ in water at 40-60° C., cooling the solution to room temperature, and then allowing the cooled solution to stand at room temperature for 20-30 hr.

10. The method of claim 5, wherein the heating step consists of heating the filtered bauxite in air to 350-450° C. for 10-30 min to remove HCl vapor.

11. The method of claim 10, wherein the heating step comprises directing hot air having a temperature of 150-200° C. vertically downward toward the filtered bauxite.

12. The method of claim 5, wherein the reduction step (5) is performed by heating the iridium catalyst-loaded bauxite to 500-700° C. for 5-7 hr while bringing the bauxite into contact with nitrogen gas having a flow rate of 400-600 $cc^{-1} \cdot g^{-1} \cdot min^{-1}$ to remove HCl vapor and residue, cooling the heated bauxite to room temperature, and then heating the cooled bauxite to 500-700° C. for 5-7 hr while bringing the bauxite into contact with hydrogen gas having a flow rate of 100-200 $cc^{-1} \cdot g^{-1} \cdot min^{-1}$ to reduce the iridium ion or oxide.

* * * * *